United States Patent [19]

Blake et al.

[11] Patent Number: 5,058,115
[45] Date of Patent: Oct. 15, 1991

[54] FAULT TOLERANT COMPUTER MEMORY SYSTEMS AND COMPONENTS EMPLOYING DUAL LEVEL ERROR CORRECTION AND DETECTION WITH LOCK-UP FEATURE

[75] Inventors: Robert M. Blake, Wappinger Falls; Douglas C. Bossen, Poughkeepsie; Chin-Long Chen, Wappinger Falls, all of N.Y.; John A. Fifield, Underhill; Howard L. Kalter, Colchester, both of Vt.; Tin-Chee Lo, Fishkill, N.Y.

[73] Assignee: International Business Machines Corp., Armonk, N.Y.

[21] Appl. No.: 322,255

[22] Filed: Mar. 10, 1989

[51] Int. Cl.⁵ .................................. H03M 13/00
[52] U.S. Cl. .................................. 371/401
[58] Field of Search .......... 371/40.1, 40.2, 37.2, 371/13, 37.3, 37.7

[56] References Cited

U.S. PATENT DOCUMENTS

| | | | |
|---|---|---|---|
| 3,697,949 | 10/1972 | Carter et al. | 371/40.1 |
| 4,175,692 | 11/1979 | Watanabe | 371/13 |
| 4,296,494 | 10/1981 | Ishikawa et al. | 371/13 |
| 4,371,930 | 2/1983 | Kim | 371/40.2 |
| 4,458,349 | 7/1984 | Aichelmann Jr. et al. | 371/13 |
| 4,464,753 | 8/1984 | Chen | 371/38 |
| 4,506,362 | 3/1985 | Morley | 371/13 |
| 4,608,687 | 8/1986 | Dutton | 371/13 |
| 4,661,955 | 4/1987 | Arlington et al. | 371/38 |
| 4,689,792 | 8/1987 | Traynor | 371/37.2 |
| 4,703,453 | 10/1987 | Shinoda et al. | 371/40.1 |
| 4,726,021 | 2/1988 | Horiguchi et al. | 371/38 |
| 4,903,268 | 2/1990 | Hidaka et al. | 371/40.1 |
| 4,918,692 | 4/1990 | Hidaka et al. | 371/40.1 |

FOREIGN PATENT DOCUMENTS

| | | |
|---|---|---|
| 0043044 | 3/1983 | Japan . |
| 0215796 | 12/1983 | Japan . |
| 0132500 | 7/1984 | Japan . |
| 2299000 | 8/1986 | Japan . |
| 0009442 | 1/1987 | Japan . |
| 0066354 | 3/1987 | Japan . |

OTHER PUBLICATIONS

1985 IEEE International Solid State Circuits Conference, titled "WAM3.2: A Worldwide 1Mb ROM with Error Correction" by H. Davis pp. 40–41.
IBM Journal of "Research & Development vol. 28, No. 2, Mar. 1984, titled Error Correcting Codes for Semiconductor Memory, Applications: A State-of the-Art Review" by C. L. Chen & M. Y. Hsiao.

Primary Examiner—Jerry Smith
Assistant Examiner—Phung M. Chung
Attorney, Agent, or Firm—Lawrence D. Cutter

[57] ABSTRACT

In a memory system comprising a plurality of memory units each of which possesses unit-level error correction capabilities and each of which are tied to a system level error correction function, memory reliability is enhanced by providing means for fixing the output of one of the memory units at a fixed value in response to the occurrence of an uncorrectable error in one of the memory units. This counter-intuitive approach to the generation of forced hard errors nonetheless enhances overall memory system reliability since it enables the employment of the complement/recomplement algorithm which depends upon the presence of reproducible errors for proper operation. Thus, clip level error correction systems, which are increasingly desirable at high packaging densities, are employed in a way which does not interfere with system level error correction methods.

7 Claims, 2 Drawing Sheets

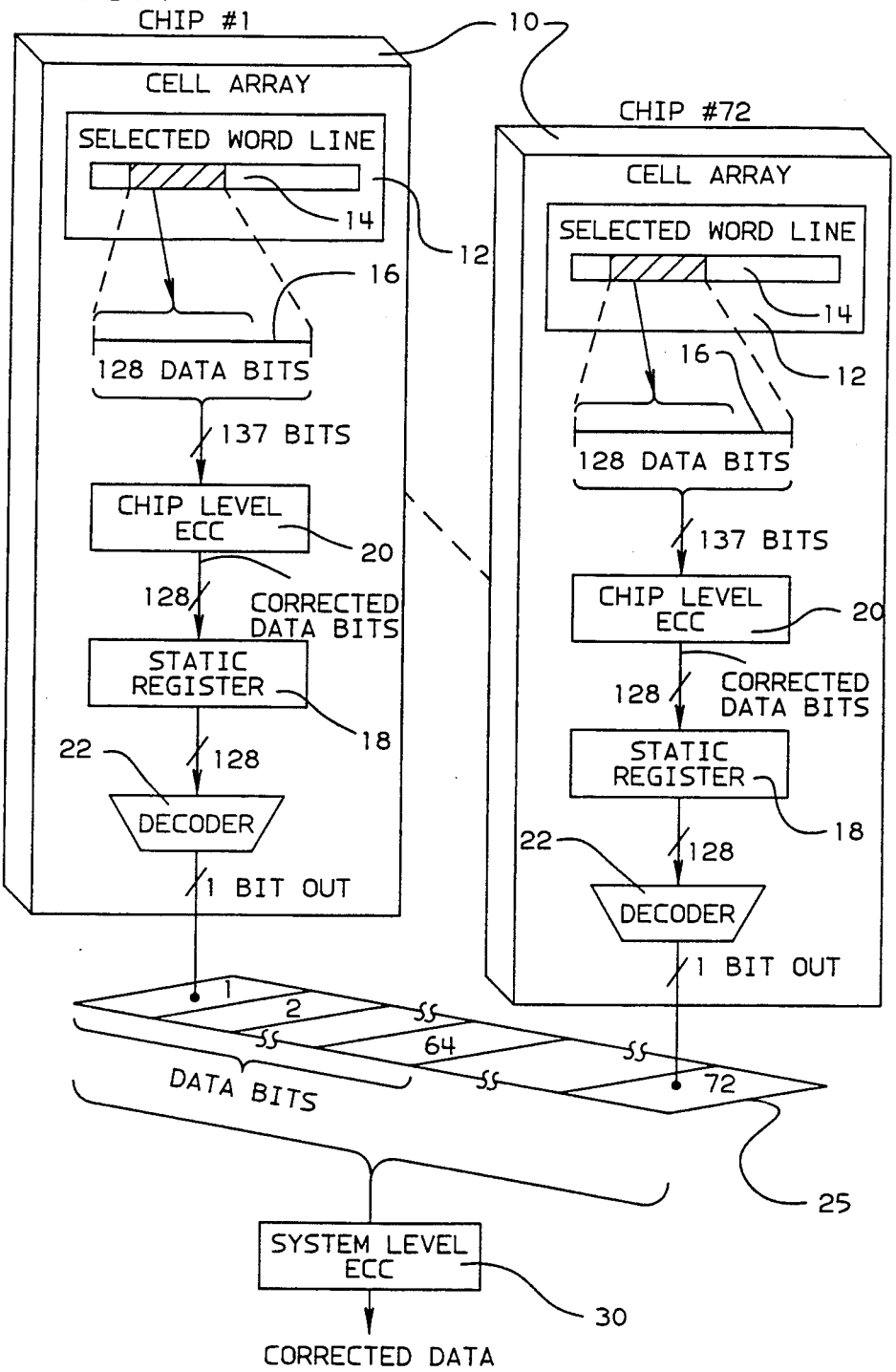

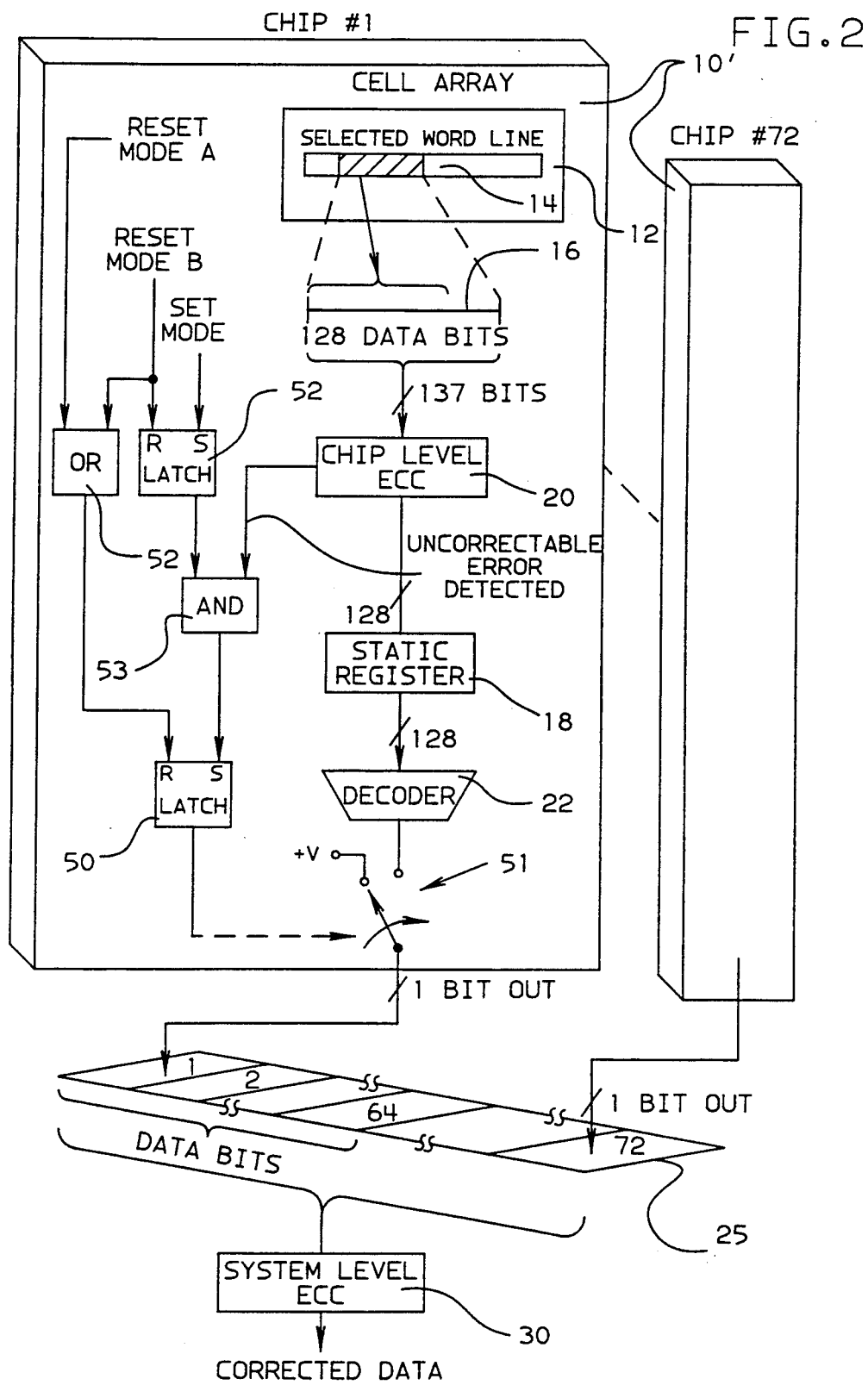

FAULT TOLERANT COMPUTER MEMORY SYSTEMS AND COMPONENTS EMPLOYING DUAL LEVEL ERROR CORRECTION AND DETECTION WITH LOCK-UP FEATURE

BACKGROUND OF THE INVENTION

The present invention is generally directed to fault tolerant computer memory systems. More particularly, the present invention is directed to computer memory systems which employ both chip level and system level error correction coding schemes. Even more particularly, the present invention relates to memory chips having on-chip error correction capabilities and lock-up means to allow the reproduction of hard errors, particularly in those situations in which the reproducibility of these errors is important for system level error recovery procedures.

As semiconductor memory chips are developed with smaller and smaller feature sizes and a corresponding increase in circuit packaging density, additional error correction methods, such as on-chip error correction, become more and more important. In general, memory errors occurring on a chip fall into two distinct categories: hard errors and soft errors. Soft errors are typically transient events, such as those induced by background level alpha particle radiation, or caused by parametric process sensitivities that create "weak cells". Weak cells are those that fail upon application of unique voltages or data patterns, or are otherwise sensitive to noise, printed image size or image tracking. With increasing chip densities, soft errors become more frequent. Thus, increasing chip density dictates a greater need for on-chip error correction capabilities, especially for soft errors.

In addition to the occurrence of soft errors which can usually be corrected by error correction coding circuitry, there is also the possibility of hard errors. Hard errors often arise out of imperfect manufacturing conditions including device contamination. With increasing memory densities, perfection in chip manufacture is very difficult. Thus, hard errors may be present in addition to soft errors. Moreover, hard errors have the seemingly paradoxical benefit of generally being able to be repeated. It is however the reproducibility of such errors which provides a mechanism for their correction (see below). One of the common forms of hard error occurring in a memory system or chip is the occurrence of a "stuck at" fault in which one of the memory locations continually indicates a zero or one output response in one or more bit positions, irrespective of the specific contents of the memory cell.

While there are many different error correction codes that are applicable and available for use in conjunction with memory systems, one of the most popular class of codes that have been employed for this purpose are codes with a minimum distance of four between code words. Such codes are capable of single error correction and double error detection (SEC/DED). These codes are well known and easily implemented and have a proven track record of reliability and ease of manufacture, particularly in terms of simplified circuitry and minimum consumption of chip "real estate". Clearly, single errors, whether hard or soft in nature, pose no problem for such codes. In addition, such codes can detect the presence of double errors, of either the hard or soft variety, but cannot generally correct them. In the event of two soft errors, it does not appear that correction is generally possible using such codes and decoding techniques. However, the presence of two hard errors, or one hard and one soft error, does lend itself to the utilization of the complement/recomplement algorithm for double error correction. This algorithm is also referred to as the double complement algorithm. This method is, for example, described in the article "Error-Correcting Codes for Semiconductor Memory Applications a State-of-the-Art Review" by C. L. Chen and M. Y. Hsiao appearing in the IBM Journal of Research and Development, pp. 124–134, March 1984. This algorithm takes advantage of the fact that hard errors are in general reproducible. As a result of this it is possible to be able to identify bit positions which are in error. With this knowledge, double error correction can in fact be carried out. It is thus seen that the reproducibility of hard errors renders it possible to improve the reliability of information storage systems which are subject to hard-hard errors or hard-soft errors without increasing code word length. Thus, aspects of memory chip design which tend to defeat hard error reproducibility also present barriers to system level double error correction especially in systems which are designed around existing single error correction and double error detection codes and circuitry.

Memory architecture itself also plays a role in error correction considerations. In particular, it is often desirable to access a double word (64 bits) of memory data wherein each bit of the double word is supplied from a separate memory chip. This memory architecture is useful in that it can provide speed and reliability advantages. Error correction coding methods are also applied to the double word of data. This is referred to herein as system level error correction (and detection). It is at this level that the complement/recomplement algorithm is employed to correct hard-hard and hard-soft errors, that is, double errors which are of a hard variety. In particular, this means that a certain number of memory chips are solely devoted to the storage of redundant coding information, typically of the parity or check sum variety.

Accordingly, it is seen that it is desirable to construct memory systems which employ on-chip error correction and detection capabilities as a result of high circuit packaging densities. SEC/DED codes are limited to correction of only 1 bit of their data words. For this reason, it is necessary to prevent any and all bit correction upon detection of a multiple error. With data correction inhibited, multiple errors cannot cause the SEC/DED system to erroneously alter a good data bit. The multiple error condition is then cleared during "writeback" (i.e., the operation of transferring the on-chip ECC WORD with its appropriate check bits back into the DRAM cells) through the on-chip ECC system as valid check bits are generated from the unaltered data word. In this system, damage to the data word integrity is limited to the original multiple errors. Although these errors can no longer be detected, the ECC system cannot cause degeneration of data words during subsequent accesses The result of using this method is that all errors at the chip level appear soft. Detection of bad memory cells in manufacturing test is effectively done with pattern testing by comparing expected data with the entire ECC word. The bits in error are easily noted and the quality of hardware under test is easily evaluated. But in actual memory system operations, the total ECC word is not read out of the memory chip. Moreover, the number of bits that are typically read out is small. This greatly increases the probability of missing the bits in error, after a multiple error in the chip data word has occurred. Such uncorrectable errors at the system level tend to cause major system failures. Upon occurrence of such an error, subsequent memory operations generally cease. At the same time, it is also seen that it is desirable to employ system level error correction and detection circuitry to increase memory reliability. It is this situation which produces the problem which is solved by the present invention. In particular, at the system level it is desirable to be able to employ the complement/recomplement algorithm to increase overall memory system reliability particularly through correction of double errors which would not otherwise be corrected. However, the complement/recomplement algorithm depends upon the ability to be able to reproduce hard errors. However, it is noted that the on-chip error correction capability can actually mask the presence of hard errors associated with a given chip. A more detailed example of this phenomenon is described below. Accordingly, the present invention is provided to solve the antagonism that can exist between chip level and system level error correction systems

SUMMARY OF THE INVENTION

In accordance with a preferred embodiment of the present invention, a fault tolerant computer memory system comprises a plurality of individual memory units. Each memory unit contains a plurality of memory cells and unit level error correction and detection means. Also present are a plurality of unit level means for indicating the presence of uncorrectable errors, these means being associated with distinct ones of the memory units. The uncorrectable error indication means operates to set at least one output bit from its associated memory unit to a fixed value upon the occurrence of an uncorrectable error. The memory units are preferably linked together through a system level register which receives data from individual memory units. The memory system also preferably includes system level correction and detection means which receives data from the system level register. In preferred embodiments of the present invention the memory units are best thought of as being individual semiconductor memory chips with on-chip error correction and detection means. Additionally, each chip is best perceived as supplying a single bit (at one time) of information to a system level word-size register which is also provided with system level error correction and detection capability.

One of the effects of the operation of the present invention is the carrying out of an effective temporary "chip kill" upon the occurrence of an uncorrectable error associated with a given chip. In effect, the occurrence of such an error on a chip forces the output of the chip to a fixed value. While this is almost certain to generate subsequent system level error indications, the reproducible nature of the forced chip error still renders it possible for system level error correction and detection circuitry to perform complement/recomplement correction. In spite of the fact that the present invention forces the output of one of the memory units to be a fixed value, nonetheless overall memory system reliability is enhanced because of the reproducible nature of the forced errors that result. Accordingly, the highly counter-intuitive result is that overall memory reliability is enhanced even though an error correction component is effectively disabled.

Accordingly, it is an object of the present invention to enhance overall computer memory system reliability.

It is a further object of the present invention to provide a fault tolerant computer memory system.

It is a still further object of the present invention to provide semiconductor memory chip designs which facilitate the reproducibility of certain chip level errors.

It is yet another object of the present invention to provide a fault tolerant memory system employing both unit or chip level error correction and detection and system level error correction and detection features.

It is also an object of the present invention to facilitate the correction and detection of hard-hard and hard-soft memory system errors.

It is yet another object of the present invention to extend the usability of high density semiconductor memory chips in memory systems, particularly through the employment of on-chip error correction and detection circuitry.

It is a still further object of the present invention to enable memory systems to apply the double complement procedure to recover data when there is an uncorrectable error in the system level error correction coding circuitry.

It is also an object of the present invention to permit memory mapping schemes to determine the location of "stuck at" faults that would normally be masked by unit level error correction.

Lastly, but not limited hereto, it is an object of the present invention to permit memory systems with on-chip error correction coding to recover more data in the face of hard errors.

DESCRIPTION OF THE FIGURES

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawings in which:

FIG. 1 is a partially schematic block diagram illustrating a memory organization which is particularly suitable for implementation of dual level error correction;

FIG. 2 is a partial block diagram similar to FIG. 1 but more particularly illustrating the presence of output lock-up means disposed on the individual memory units (chips).

DETAILED DESCRIPTION OF THE INVENTION

FIG. 1 illustrates a memory organization which is particularly suitable for the employment of the present invention. In particular, FIG. 1 illustrates a computer memory organization comprising a plurality of 72 individual memory chips 10. However, it should be appreciated that the present invention is not limited to semiconductor memories but is generally applicable to any computer memory system in which a plurality of memory units each provide single or multiple output bits to a register and in which both unit level and system level error correction circuitry is employed. In the system shown in FIG. 1, each of the 72 memory units 10 supplies a single bit to system level or W-register 25.

Register 25 is also seen to supply output data through system level error correction circuitry 30. Furthermore, it is also seen that chip or unit level error correcting circuitry 20 is provided on each of the memory units or chips 10.

In the particular embodiment shown in FIG. 1, it is seen that cell array 12 is organized in words of 137 bits occurring in selected word line 14. Of these 137 bits, 128 bits comprise data bits with the remaining 9 bits being parity check bits. This is sufficient to provide on-chip single error correction and double error detection. The 137 bits of cell array information 16 are selected from word line 14 and passed on to chip level error correction circuitry 20 which provides 128 bits of corrected data to static register 18. Memory unit 10 is also supplied with address field information (not shown) which is employed by decoder 22 to select a single output bit from static register 18. The output of decoders 22 in chips 1 through 72 are supplied to corresponding cells in register 25. These cells typically comprise flip-flop circuit elements. In particular, it is seen that system level register 25 includes 72 bits of information of which 64 bits comprise data with 8 bits comprising parity check information. Again, single error correction and double error detection are possible with this degree of redundancy. The specific nature of the code or of the detection and correction circuitry employed either at the unit level or at the system level are substantially irrelevant to the practice of the invention. Any suitable code may be employed for this purpose.

The disadvantage of the system shown in FIG. 1 is that hard error such as "stuck at" faults occurring in a particular cell array 12 render it impossible for system level error correction coding methods to employ the complement/recomplement method for recovering from hard-hard and hard-soft errors (that is, double errors which are hard in nature). It is further noted that the specific structure of the memory system shown in FIG. 1 should not be construed as limiting the present invention. In particular, the choice of codes, as indicated above, is relatively arbitrary, as is the number of chips employed and the particular word organization of cell arrays 12. The relevant aspects of FIG. 1 encompass the dual level error correction capabilities and the independent organization of the memory units, particularly with respect to their supplying independent bits of information to register 25.

In order to more fully comprehend the problem associated with the memory system of FIG. 1, consideration is now directed to a simplified example of the problems that certain hard errors such as "stuck at" faults can engender. In particular, consideration is given to a memory structure in which each word comprises 8 bits, the first 4 bits being data bits and the last 4 bits being parity sum check bits. In particular, and solely for the purposes of explanation, it is assumed that the error correcting code matrix is the one provided in the table below:

TABLE I

| 1 | 0 | 1 | 1 | 1 | 0 | 0 | 0 |
|---|---|---|---|---|---|---|---|
| 1 | 1 | 0 | 1 | 0 | 1 | 0 | 0 |
| 1 | 1 | 1 | 0 | 0 | 0 | 1 | 0 |
| 0 | 1 | 1 | 1 | 0 | 0 | 0 | 1 |

It is also assumed that there are present two "stuck at" faults occurring in the first two output bit positions of the memory array being described. If four bits of data 0000 are written into the memory, the word written into the array is 00000000 in accordance with the matrix provided above. However, the data read out of the memory is 1100 indicating an error pattern of 1100 because of the two "stuck at" faults. However, if the data 0100 is desired to be stored in the memory array, the word written into the array is 01000111 in accordance with the parity check matrix implied by the matrix given above. However, again because of the two "stuck at" faults in the first two output bit positions the word read out of the array is 11000111. However, because of the unit level error correction capabilities, the data read out of the memory is indicated as 0100 clearly implying an error pattern of 0000 since this is the same pattern written into the memory. Thus it is seen that, depending upon the data written into the memory, the existence of "stuck at" faults can be masked. It is in fact the masking of these faults which would normally prohibit application of the complement/recomplement algorithm for correcting hard-hard errors. The situation above is summarized in the table below:

TABLE II

| STUCK AT FAULTS | 1 | 1 | | | | | | |
|---|---|---|---|---|---|---|---|---|
| WRITE DATA | 0 | 0 | 0 | 0 | | | | |
| WRITE WORD | 0 | 0 | 0 | 0 | 0 | 0 | 0 | 0 |
| READ DATA | 1 | 1 | 0 | 0 | | | | |
| ERROR | 1 | 1 | 0 | 0 | | | | |
| WRITE DATA | 0 | 1 | 0 | 0 | | | | |
| WRITE WORD | 0 | 1 | 0 | 0 | 0 | 1 | 1 | 1 |
| READ WORD | 1 | 1 | 0 | 0 | 0 | 1 | 1 | 1 |
| READ DATA | 0 | 1 | 0 | 0 | | | | |
| ERROR | 0 | 0 | 0 | 0 | | | | |

Attention is now specifically directed to FIG. 2 in which memory units 10' have been substituted for memory units 10. In particular, it is seen that in FIG. 2 unit or chip level error correction circuitry 20 is also employed to provide an uncorrectable error indication signal to latch 50 thru AND-gate 53. The chip is first initialized to have correct data and parity check bits in all of the ECC words "behind" the on-chip ECC. Upon completion of the initialization, the SET MODE signal line is used to set latch 52 such that the uncorrectable error detection signal can set latch 50 thru AND-gate 53, for output lock-up and hard error. The SET MODE signal is generated using standard known methods like an over voltage for an existing input or inputs or by the newly defined JEDEC standard in which $\overline{CE}$ and $\overline{W}$ are active before $\overline{RE}$ and in which addresses at $\overline{RE}$ are decoded to provide the SET MODE input signal.

The presence of an uncorrectable error can be readily indicated by counting the number of one bits that are turned on in an error location vector generated by error correction/detection circuitry 20. Thus if the code chosen is a single error correction/double error detection code, and if the output of functional block 20 is set up to indicate positions in which errors have occurred, then it is a simple matter to determine whether or not more than one error has occurred simply by counting bits. If so, an uncorrectable error occurrence can be provided and is supplied to the SET input S of latch 50 via AND-gate 53. The RESET input R of latch 50 is supplied via the same methods as discussed earlier for the SET MODE input. RESET MODE A resets only latch 50 allowing normal operation to return after system error recovery is accomplished and data can be read from the array until another multiple error is encountered. RESET MODE B, again supplied by methods indicated above, can be used to disable the entire lock-up feature allowing data from the array to be accessed without lock-up if a multiple error is encountered. The use of RESET MODE A or B can be used in conjunction with system error recovery to allow the data from the bad area "behind" the on-chip ECC to be mapped and corrected and put into another array with the use of normal chip sparing methods. The output of latch 50 controls selection of output from memory unit 10' through switch 51. In particular, the normal operation of switch 51 is such that the single bit output signal is supplied directly from decoder 22. However, upon the occurrence of an uncorrectable error, the output is set by switch 51 to a fixed value. Typically, this fixed value is a binary 1 as suggested by the +V symbol shown, but could be the fixed value binary 0 by changing the +V signal line to ground. In this way, the presence of uncorrectable errors results in forcing the output of memory unit 10' to a fixed value. This provides the ability to reproduce hard errors, a property which is necessary for the proper operation of the complement/recomplement method employed for error correction of hard-hard or soft-hard errors at the system level. In this way, when memory unit 10' of FIG. 2 is employed in a fault tolerant memory system, greater reliability is achievable. Without the memory unit modification, whenever there is a double error at the system level, the data is not recoverable. With the memory unit modification, all hard-hard and hard-soft errors at the system level are correctable.

From the above, it should be appreciated that the present invention provides a mechanism for enhancing the fault tolerant capabilities of memory systems, particularly high density semiconductor memories comprising a plurality of integrated circuit chips. More particularly, it is seen that the present applicants have provided a counter-intuitive approach in which chip level memory system output is forced to a fixed level in order to improve overall system level error correction capabilities. Thus, applicants have employed the seemingly paradoxical approach of forcing errors to improve error correction capabilities. It is therefore seen that applicants have contributed to significant advances in the areas of memory architecture and error correction. It is further seen that applicants have done so at minimal cost and with a design which is applicable to any memory chip employing on-chip error correction capabilities.

The on-chip error correcting capabilities described above with reference to a full chip can also work on subsections such as half chips, quarter chips, octant chips, etc. as chip architecture dictates.

While the invention has been described in detail herein in accord with certain preferred embodiments thereof, many modifications and changes therein may be effected by those skilled in the art. Accordingly, it is intended by the appended claims to cover all such modifications and changes as fall within the true spirit and scope of the invention.

The invention claimed is:

1. A fault tolerant computer memory system which receives address information and which supplies data information in response thereto, said memory system comprising:
  a plurality of digital memory units;
  a plurality of unit level error correction and detection means, said means being associated with distinct ones of said memory units, for correcting and detecting errors in data read from memory cells within said memory units and for generating an uncorrectable error signal;
  a plurality of unit level error correction and detection means, said means being associated with distinct ones of said memory units, for correcting and detecting errors in data read from memory cells within said memory units and for generating an uncorrectable error signal;
  a plurality of unit level lock-up means associated with distinct ones of said memory units and operating to set at least one output bit, from their associated memory units, to a fixed value upon the receipt of said uncorrectable error signal from their associated unit level error correction and detection means; and
  system level error correction and detection means receiving data from said memory units, said system level correction and detection means being operable to correct hard errors by operation of said lock-up means.

2. The memory system of claim 1 in which said memory units comprise semiconductor memory chips.

3. The memory system of claim 1 in which said unit level error correction and detection means perform single error correction and double error detection.

4. The memory system of claim 1 further including mode switching means operable to control the activation of said lock-up means.

5. A fault tolerant memory unit for a memory system which receives address information and which supplies data information in response thereto, said memory unit comprising:
  a plurality of memory cells;
  means for error correction and detection for data read from said memory cells and for generating an uncorrectable error signal; and
  lock-up means operable to set at least one output bit from said memory unit to a fixed value upon the indication of an uncorrectable error from said error correction and detection means.

6. The memory unit of claim 5 which is disposed on a single integrated circuit chip.

7. The memory unit of claim 5 in which said means for error correction and detection performs single error correction and double error detection.

* * * * *

UNITED STATES PATENT AND TRADEMARK OFFICE
CERTIFICATE OF CORRECTION

PATENT NO. : 5,058,115
DATED : October 15, 1991
INVENTOR(S) : Blake et al.

It is certified that error appears in the above-identified patent and that said Letters Patent is hereby corrected as shown below:

Column 8, Claim 1, Lines 15 through 20     delete --a plurality of unit level error correction and detection means, said means being associated with distinct ones of said memory units, for correcting and detecting errors in data read from memory cells within said memory units and for generating an uncorrectable error signal;--

Signed and Sealed this

Second Day of December, 1997

*Attest:*

BRUCE LEHMAN

*Attesting Officer*     Commissioner of Patents and Trademarks